United States Patent [19]

Knight et al.

[11] Patent Number: 5,234,547
[45] Date of Patent: Aug. 10, 1993

[54] CREPING AID

[75] Inventors: Paul Knight, Finchwood Park; Ulrich Welkener, Chester, both of England

[73] Assignee: W.R. Grace & Co.-Conn., New York, N.Y.

[21] Appl. No.: 855,808

[22] Filed: Mar. 23, 1992

[30] Foreign Application Priority Data

Mar. 28, 1991 [GB] United Kingdom ................ 9106626

[51] Int. Cl.$^5$ ................................................ B31F 1/12
[52] U.S. Cl. .................................... 162/111; 162/112; 264/283
[58] Field of Search ................ 162/111, 112; 264/282, 264/283; 156/183

[56] References Cited

U.S. PATENT DOCUMENTS

| | | | |
|---|---|---|---|
| 3,926,716 | 12/1975 | Bates | 162/111 |
| 4,064,213 | 12/1977 | Lazorisak et al. | 162/112 |
| 4,176,107 | 11/1979 | Buckman et al. | 260/29.60 |
| 4,406,737 | 9/1983 | Latimer et al. | 162/111 |
| 4,528,316 | 7/1985 | Soerens | 162/111 |
| 4,883,564 | 11/1989 | Chen et al. | 162/111 |
| 4,886,579 | 12/1989 | Clark et al. | 167/111 |
| 4,994,146 | 2/1991 | Soerens | 162/112 |
| 5,094,717 | 3/1992 | Manning et al. | 162/111 |

Primary Examiner—Peter Chin
Attorney, Agent, or Firm—James P. Barr

[57] ABSTRACT

A method of creping a paper is described which comprises applying to the creping drum prior to the application of the paper web to be creped, a synthetic anionic polymer.

8 Claims, No Drawings

CREPING AID

The present invention relates to a creping aid composition and, in particular, a creping aid composition for application to a creping drum (also known as a Yankee or MG cylinder) in an apparatus for producing soft, lightweight paper web suitable for making sanitary paper products such as bathroom and facial tissue, papers towels and napkins.

It is conventional practice to produce soft paper web by mechanically or chemically disrupting interfibre bonds in the paper web. Such practices include the use of a creping or doctor blade to crepe paper from a drying surface. This procedure usually involves the application of a creping aid composition to the surface of the creping cylinder immediately prior to the web contacting the cylinder. The creping aid composition causes substantial adherence of the web to the creping cylinder at the point of contact with the creping blade. Under these conditions, a high bulked and internally delaminated web is produced.

The creping aids which are widely used include polyvinylalcohol, ethylene-vinyl acetate copolymers, animal glues, polyvinylacetate and cationic polyaminoamide wet strength resins. These nonionic and cationic polymers may be used alone or in combination with each other. However they are generally all used with a release agent, typically an imidazoline. In practice it is normal to vary the composition of the blend which is applied to the creping cylinder in order to control the adhesion of the web to the cylinder surface. While release agents are generally needed, there is a problem when the creping cylinder is at elevated temperature, for example 130° to 140°, since the agents tend to destroy the surface film.

It has now surprisingly been found, according to the present invention, that the use of synthetic anionic polymers give superior controlled adhesion properties. In other words when these polymers are applied to the creping cylinder the web adheres better to the cylinder with the result that improved creping takes place. Also, while it is desirable to use such polymers in combination with a release agent it has been found that the concentration of release agent employed can be significantly reduced and even eliminated compared to the levels currently used with conventional creping aids. Indeed it has been found that these polymers work satisfactorily at elevated temperatures where a release agent cannot normally be used. Further there is no need for a chemical debonding agent in the method of this invention. Accordingly, the present invention provides a method of creping a paper which comprises applying to the creping drum (prior to the application of the paper web to be creped) a synthetic anionic polymer and, preferably also, a release agent.

It has been found that the resulting paper sheet is of superior bulk and softness even though significantly lower amounts of the polymer and release agent (if at all) are employed as compared with the amounts conventionally used with convention creping aids.

The polymers used in the present invention are preferably (meth) acrylate polymers and especially polymers of acrylic or methacrylic acid. Preferred polymers are generally random copolymers, for example those which can be represented by the following formula:

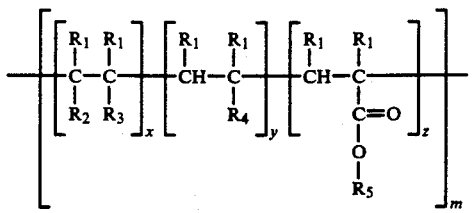

wherein
each $R_1$ individually represents H or a $C_1$ to $C_8$ alkyl group
$R_2$ represents H, —$CO_2X$ or —$CH_2CO_2X$ and
$R_3$ represents —$CO_2X$,
or $R_2$ and $R_3$ together represent —CO—O—CO—,
$R_4$ represents —$CONH_2$ or —$CON(CH_3)_2$
$R_5$ represents a $C_1$ to $C_8$ alkyl group
X represents H or $NH_4$ or an alkali metal
m is an integer from 3 to about 100
x, y, z individually represent the relative mole ratios of each monomer such that x and y are from 1 to 9 and z can be from 0 to 5.

It will be appreciated that the formula does not mean that the first recurring unit is in a block of x units etc.

Preferred copolymers for use in the present invention are random copolymers of
A - acrylic acid and/or methacrylic acid with
B - acrylamide and/or methaorylamide with optionally,
C - an alkyl acrylate or alkyl (meth) acrylate ester, present in the specified proportions so as to impart water solubility to the copolymer.

The mole ratios of A to B is generally from 1:9 to 9:1 but preferably from 1:5 to 5:1. Up to, say, 50 mole percent of A to B may be replaced by C.

The molecular weight range of the polymers used in the present invention is generally 1,000 to 500,000 but preferably 5,000 to 200,000 and especially 5,000 to 150,000 (Mw as determined by 9el permeation chromatography). Thus particularly preferred polymers for use in the present invention include copolymers of (meth)acrylic acid and acrylamide, especially those with a mole ratio (respectively) of 1:5 to 5:1 as well as such colymers which are also derived from methyl acrylate with a mole ratio of acrylic acid to methyl acrylate of 10:1 to 1:1, especially 5:1 to 1:1.

The copolymers used in the present invention can generally be prepared by the usual free-radical type polymerisation conditions in aqueous media. Although it is possible to obtain certain acrylic acid copolymers by hydrolysing polyacrylamide, it will be appreciated that the copolymers used in the present invention derived from methacrylic acid cannot be prepared by parrial hydrolysis in this way because, of course, hydrolysis of acrylamide will yield only acrylic acid and not methacrylic acid.

Although a single polymer can be used it has been found that greater control to deal with varying conditions can be achieved by a using a mixture of polymers. The selection of a one or two product approach will be determined by the machine conditions. It is likely that those mills producing a wide range of tissue grades from variable furnish will view the two product approach to be more flexible in terms of having greater control over the creping process. The polymers can be applied together or, for greater flexibility, separately. It has also been found that the second polymer although it is desirably an acrylate polymer need not necessarily be derived from an acrylamide. Typical such polymers are those having the general formula set out above as defined above except that x is from 1 to 10 and y and z are each independently from 0 to 5. It is believed, although this forms no part of the present invention, that this second acrylate polymer cross-links with the acrylamide polymer thus enhancing the strength of the film and thereby further improving adhesion of the web to the creping cylinder.

The relative proportions of the two polymers is not particularly critical although, typically, they will be used in a weight ratio from 1:5 to 5:1.

The usual release agents can be employed with the anionic polymers. These include imidazolines as well as oils such as mineral oil defoamers and other deroaming agents including quaternary surfactants which have a softening effect on the paper web. It will be appreciated that, for greater control, the polymer and release agent will normally be applied separately.

The amounts used will, of course, depend very much on the nature of the paper and the degree of softness to be obtained. But, in general, from 0.1 to 0.3 grams of polymer is required per square meter of surface of the creping drum. Typically the polymers are applied as aqueous solutions containing, say, 5 to 50, generally 5 to 10, for example about 10, % by weight.

The present invention will now be illustrated by the following Examples:

EXAMPLE 1

Method I a) The sample was applied at 10% ds to a stainless steel panel (dimensions 2"×5"). The sample was spread as evenly as possible across the surface.

b) The sample was air dried in a fan oven without heat.

c) The panel was placed onto a laboratory hot plate (DATAPLATE, digital hotplate and stirrer) and heated to a surface temperature of 93° C.

d) A wet cotton cloth (dimensions 2"×8") containing approximately three times its weight of water was applied to the hot panel to cover the surface and pressed onto the panel by rolling over it a 2 kg cylinder.

e) While the cloth dried on the hot plate the surface temperature was raised to 99° C.

f) When the cloth was dry it was peeled off by hand at an angle of 180 degrees. The degree of adhesiveness was noted on a scale from 1 to 5 (1 being very adhesive and 5 being not adhesive at all).

| EXAMPLES PRODUCT | ADHESIVENESS | CHEMICAL CHARACTERISTICS |
|---|---|---|
| A | 2 | Polyamide/EPI wet strength resin |
| B | 5 | Polyvinylalcohol |
| C | 3 | Polyamide/EPI wet strength resin |
| D | 2 | Polyvinylacetate (MW 500,000–1,500,000) |
| E | 2 | Polyvinylacetate (MW 5,000–20,000) |
| F | 5 | Methacrylic/acrylamide 1:4 Copolymer (MW 18,00) |
| G | 4 | Methacrylic/acrylamide 1:2 Copolymer (MW 10,000) |
| H | 2 | Methacrylic/acrylamide 1:1 Copolymer (MW 10,000) |

The molecular weights of the copolymers we-e determined by gel permeation chromatography.

Method II a) The samples were applied to a 2"×5" stainless steel panel as evenly as possible.

b) The panel was placed onto a laboratory hot plate (DATAPLATE, digital hotplate, stirrer) and heated to a surface temperature of 85° C.

c) Before the creping aid dried a wet cotton cloth (2"×8") containing approximately three times its weight of water was applied to the hot panel to cover the surface and rolled down with a 2 kg cylinder.

d) When the cloth was dry it was peeled off by hand at an angle of 180 degrees. The degree of adhesiveness was noted on a scale from 1 to 5 (1 being very adhesive and 5 being not adhesive at all).

| EXAMPLES PRODUCT | ADHESIVENESS | CHEMICAL CHARACTERISTICS |
|---|---|---|
| I | 2 | Polyamide/EPI wet strength resin |
| J | 3 | Polyvinylacetate |
| K | 1 (cotton cloth ruptured!) | Polyvinylacetate |
| L | 3 | Methacrylic/acrylamide 1:4 Copolymer (MW 18,00) |
| M | 2 | Methacrylic/acrylamide 2:1 Copolymer (MW 20,000) |

EXAMPLE 2

Two polymers were evaluated for the production of medium weight (25 grammes per square meter) tissue. The composition of the polymers is as follows:

| POLYMER | COMPOSITION (MOLE RATIO) |
|---|---|
| I | Acrylic Acid/Acrylamide/Methyl Acrylate 2.0:0.7:0.2 |
| J | Acrylic Acid/Methyl Acrylate 70:30 |

The molecular weight (Mw) as determined by gel permeation chromatography is 127,000 for polymer I and 38,000 for polymer J.

The machine in question has a creping cylinder with a surface temperature in the range of 130°–140° C. The creping process can be controlled using conventional polymeric additives (a polyvinyl acetate emulsion and a thermosetting polyaminoamide) via a spray bar to the cylinder surface. These were dosed into the header tank (as 1% by weight aqueous solutions) at rates of 12 and 8 milliliters per minute. No release oil was used.

Polymers I an J were dosed (as 10% by weight aqueous solutions) via the spray bar at rates of 1.8 and 3.6 milliliters per minute respectively. Despite the considerably lower dose rates the rate of film formation on the cylinder surface was found to be much faster than with conventional technology: 1–2 minutes compared to 10–20 minutes.

The physical properties of the sheet were unchanged using the Polymers I and J. For such grades of crepe paper softness is not vitally important. However, the softness of the sheet produced with these polymers was at least as good as if not better than with the established polymers.

We claim:

1. A method of creping a paper which comprises applying to a heated creping drum, prior to the application of the paper web to be creped, a synthetic anionic polymer having the formula

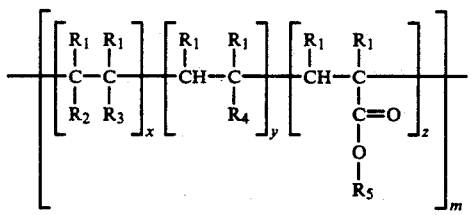

wherein each $R_1$ individually represents H or a $C_1$ to $C_8$ alkyl group, $R_2$ represents H, $-CO_2X$ or $-CH_2CO_2X$, $R_3$ represents $-CO_2X$, or $R_2$ and $R_3$ together represent $-CO-O-CO-$, $R_4$ represents $-CONH_2$ or $-CON(CH_3)_2$, $R_5$ represents a $C_1$ to $C_6$ alkyl group, X represents H, NH, or an alkali metal, m is an integer from 3 to about 100, x, y and z individually represent relative mole ratios of each monomer such that x and y are from 1 to 9 and z is from 0 to 5 in an amount sufficient to adhere the paper web to the creping drum and creping the paper web from said creping drum.

2. A method according to claim 1 in which a release agent is also applied to the creping drum.

3. A method according to claim 1 in which the anionic polymer is an acrylate or methacrylate polymer.

4. A method according to claim 3 in which the anionic polymer is derived from acrylic or methacrylic acid.

5. A method according to claim 1 in which the polymer is a copolymer of acrylic and/or methacrylic acid with acrylamide and/of methacrylamide and, optionally, an alkyl acrylate or alky(meth) acrylate ester.

6. A method according to claim 5 in which the mole ratio of acid to amide is from 1:5 to 5:1.

7. A method according to claim 1 in which the polymer has a molecular weight from 5,000 to 150,000, as determined by gel permiation chromatography.

8. A method according to claim 2 in which the release agent is an imidazoline or a mineral oil defoamer.

* * * * *

UNITED STATES PATENT AND TRADEMARK OFFICE
CERTIFICATE OF CORRECTION

PATENT NO. : 5,234,547
DATED : August 10, 1993
INVENTOR(S) : Knight et al

It is certified that error appears in the above-indentified patent and that said Letters Patent is hereby corrected as shown below:

In Claim 1, column 5, line 20, change "$C_6$" to --$C_8$--.

Signed and Sealed this

Twenty-first Day of May, 1996

Attest:

BRUCE LEHMAN

Attesting Officer     Commissioner of Patents and Trademarks